United States Patent
Schuster

(10) Patent No.: US 10,994,927 B2
(45) Date of Patent: May 4, 2021

(54) AUTOMATED CARTING ASSEMBLY

(71) Applicant: Brian Schuster, Northbrook, IL (US)

(72) Inventor: Brian Schuster, Northbrook, IL (US)

( * ) Notice: Subject to any disclaimer, the term of this patent is extended or adjusted under 35 U.S.C. 154(b) by 145 days.

(21) Appl. No.: 16/285,975

(22) Filed: Feb. 26, 2019

(65) Prior Publication Data

US 2020/0270055 A1 Aug. 27, 2020

(51) Int. Cl.
| | |
|---|---|
| B65F 1/14 | (2006.01) |
| G05D 1/02 | (2020.01) |
| B62B 5/00 | (2006.01) |
| B62B 3/06 | (2006.01) |
| B62B 3/00 | (2006.01) |
| B62B 3/02 | (2006.01) |
| G05D 1/00 | (2006.01) |
| B62B 3/10 | (2006.01) |

(52) U.S. Cl.
CPC ............ *B65F 1/1468* (2013.01); *B62B 3/001* (2013.01); *B62B 3/02* (2013.01); *B62B 3/0637* (2013.01); *B62B 3/104* (2013.01); *B62B 5/0033* (2013.01); *G05D 1/0088* (2013.01); *G05D 1/0278* (2013.01); *B62B 2202/20* (2013.01); *B65F 2210/128* (2013.01)

(58) Field of Classification Search
CPC ............ B65F 1/1468; B65F 2210/128; G05D 1/0278; G05D 1/0088; B62B 5/0033; B62B 3/0637; B62B 3/001; B62B 3/02; B62B 3/104; B62B 2202/20
See application file for complete search history.

(56) References Cited

U.S. PATENT DOCUMENTS

| | | | |
|---|---|---|---|
| 4,807,716 A | 2/1989 | Hawkins | |
| 6,129,166 A * | 10/2000 | Sueshige | B60K 1/00 180/65.6 |
| 6,237,503 B1 | 5/2001 | Kollbeck | |
| 6,404,159 B1 * | 6/2002 | Cavallini | B60L 50/60 318/587 |
| 6,742,792 B1 * | 6/2004 | Hooper | B62B 3/002 150/154 |
| 6,966,574 B1 * | 11/2005 | Dahl | B62B 1/002 280/47.18 |
| 7,210,890 B2 * | 5/2007 | Curotto | B65F 3/041 414/408 |
| 7,232,136 B2 | 6/2007 | Sheehan | |
| D573,768 S | 7/2008 | Tuncel | |
| 8,146,695 B1 | 4/2012 | Ramshur | |

(Continued)

FOREIGN PATENT DOCUMENTS

WO WO2007059794 5/2007

*Primary Examiner* — Peter D Nolan
*Assistant Examiner* — Ashley L Redhead, Jr.

(57) ABSTRACT

An automated carting assembly includes a cart that has a plurality of garbage containers each being positioned thereon. The cart has a slidably adjustable length for accommodation a varying number of the garbage containers. A pair of rear wheels is each rotatably coupled to the cart for rolling on a support surface and each of the front wheels is steerable on the cart. A pair of front wheels is each rotatably coupled to the cart for rolling along the support surface. A pair of steering actuators is each coupled to a respective one of the front wheels for steering the cart. A pair of drive motors is each rotatably coupled to a respective one of the front wheels for driving the cart between a storage point and a pickup point.

9 Claims, 5 Drawing Sheets

(56) References Cited

U.S. PATENT DOCUMENTS

| | | | |
|---|---|---|---|
| 9,260,061 B1* | 2/2016 | Rudd | A63B 71/0045 |
| 2003/0059288 A1* | 3/2003 | Robinson | B66F 9/18 |
| | | | 414/539 |

* cited by examiner

AUTOMATED CARTING ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to carting devices and more particularly pertains to a new carting device for autonomously transporting garbage containers to a curb for emptying.

BRIEF SUMMARY OF THE INVENTION

An embodiment of the disclosure meets the needs presented above by generally comprising a cart that has a plurality of garbage containers each being positioned thereon. The cart has a slidably adjustable length for accommodation a varying number of the garbage containers. A pair of rear wheels is each rotatably coupled to the cart for rolling on a support surface and each of the front wheels is steerable on the cart. A pair of front wheels is each rotatably coupled to the cart for rolling along the support surface. A pair of steering actuators is each coupled to a respective one of the front wheels for steering the cart. A pair of drive motors is each rotatably coupled to a respective one of the front wheels for driving the cart between a storage point and a pickup point.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
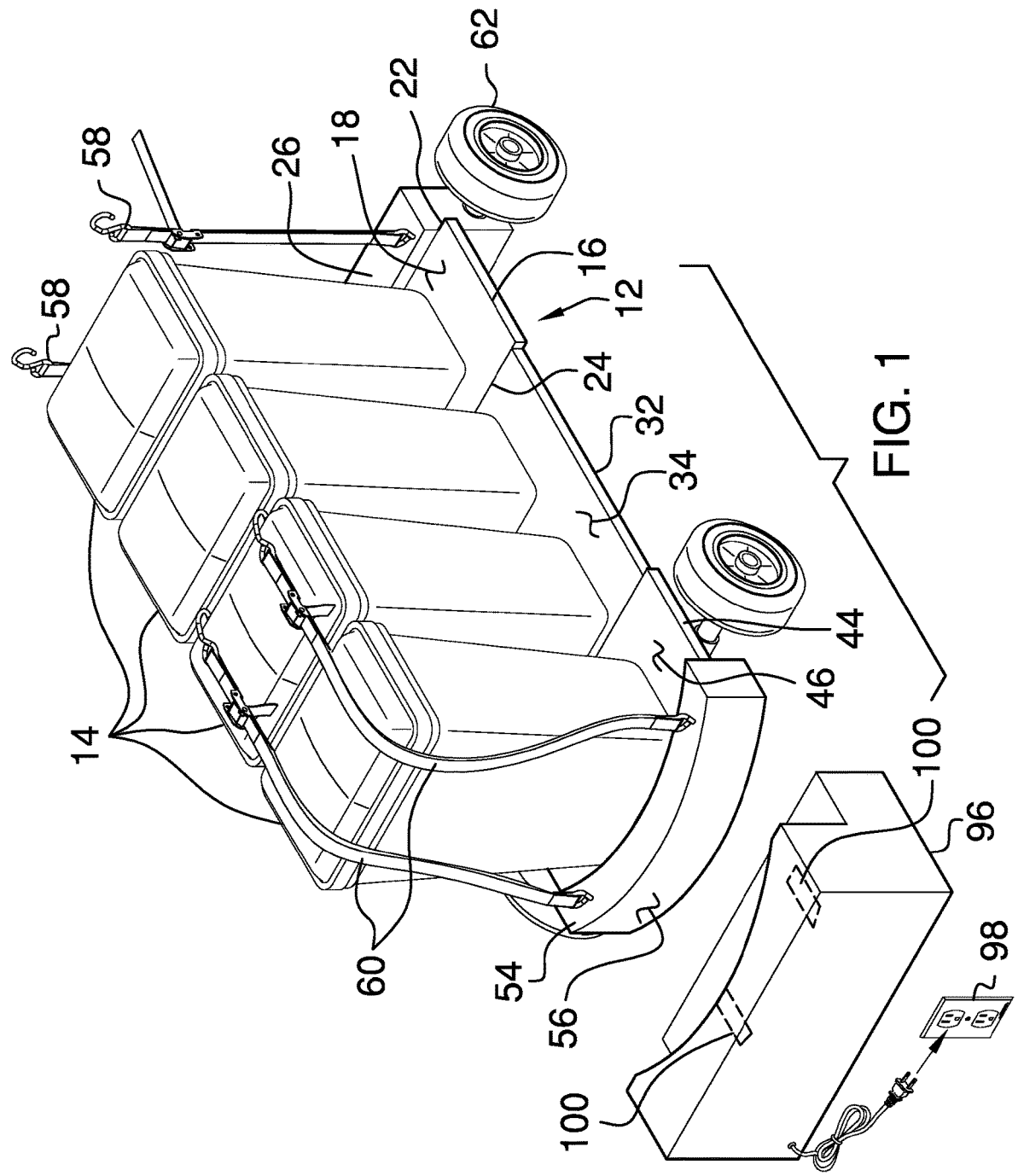
FIG. 1 is a top perspective view of an automated carting assembly according to an embodiment of the disclosure.
Figure 2:
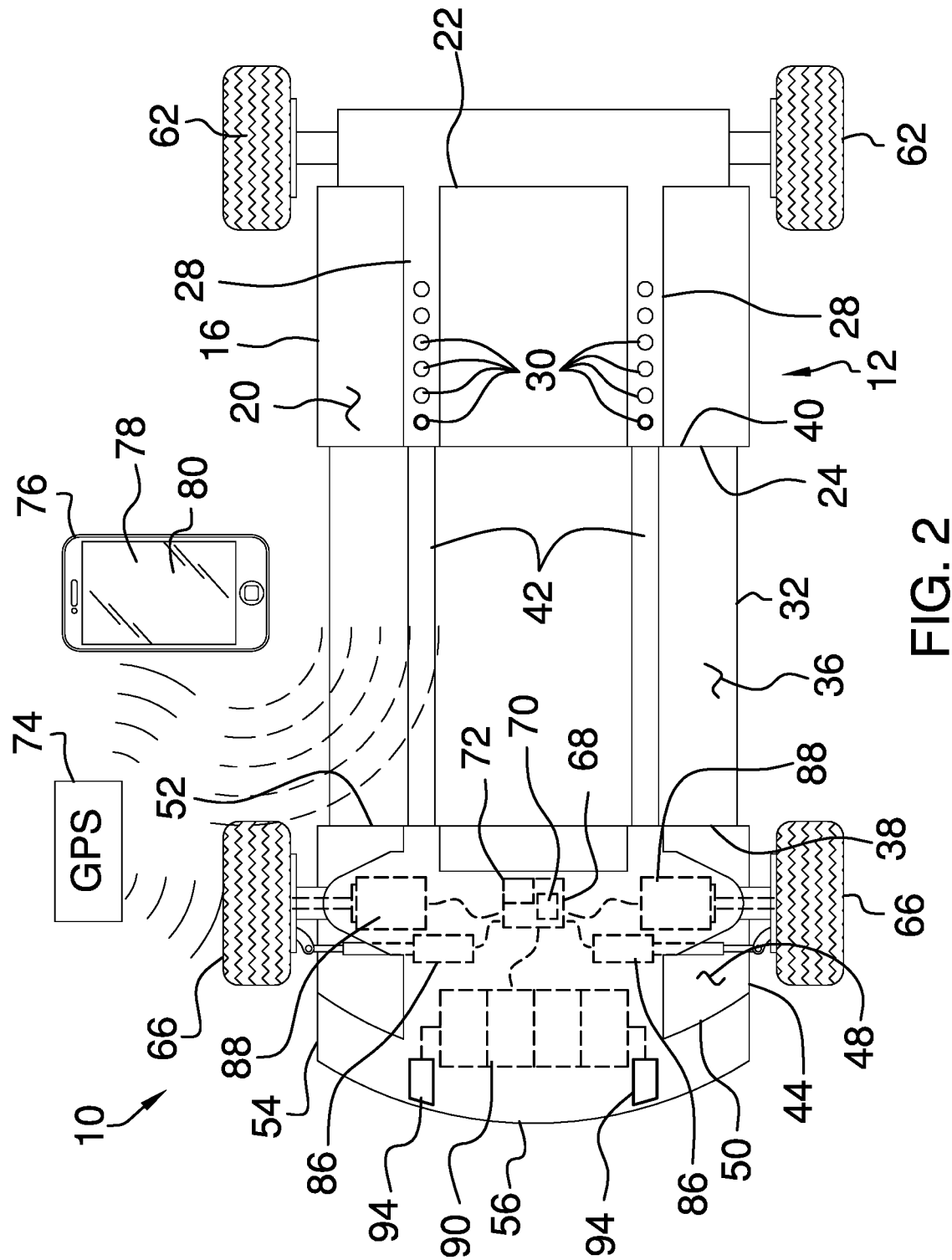
FIG. 2 is a bottom phantom view of an embodiment of the disclosure.
Figure 3:
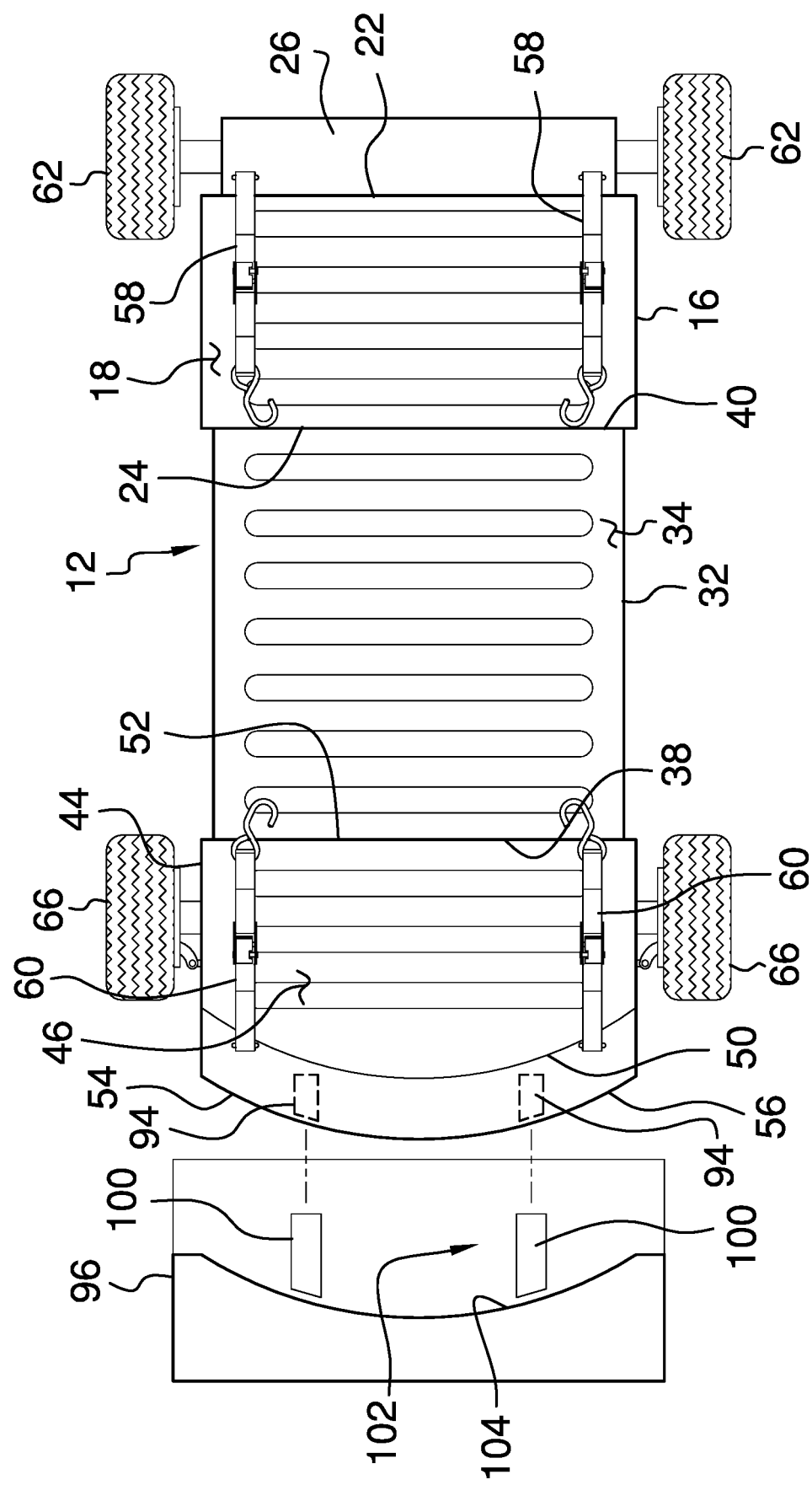
FIG. 3 is a top view of an embodiment of the disclosure.
Figure 4:
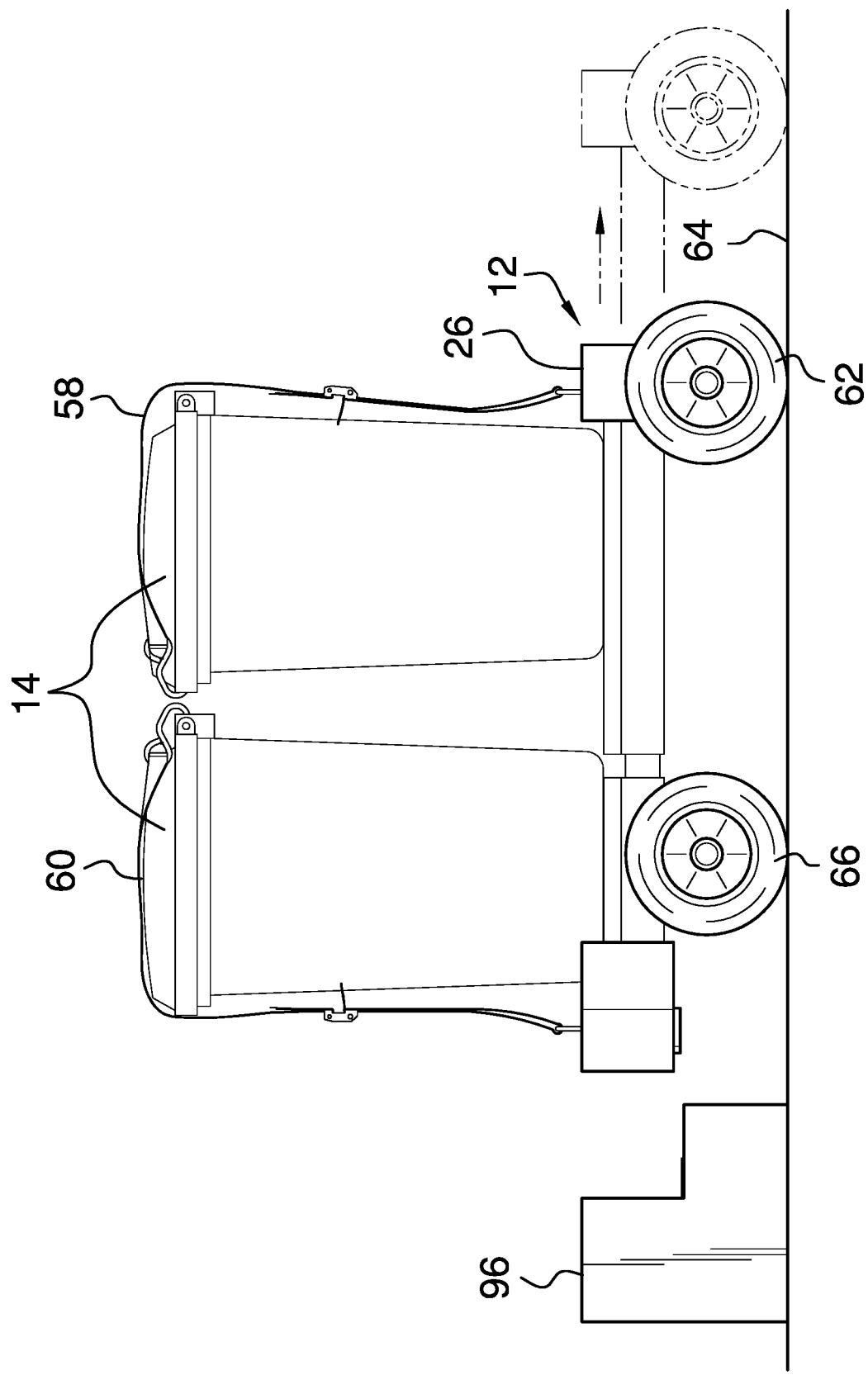
FIG. 4 is a left side view of an embodiment of the disclosure.
Figure 5:
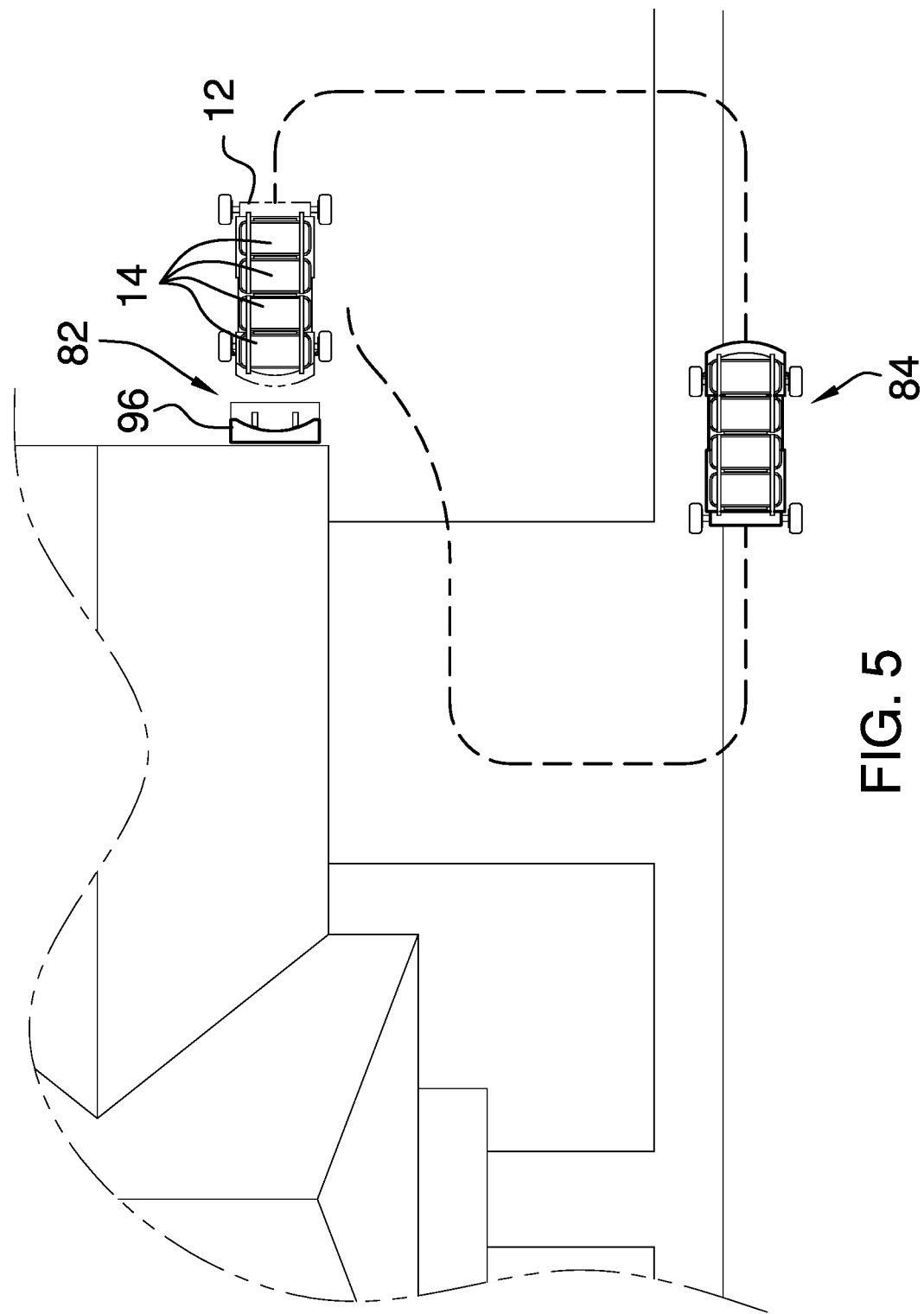
FIG. 5 is a perspective in-use view of an embodiment of the disclosure.

With reference now to the drawings, and in particular to FIGS. 1 through 5 thereof, a new carting device embodying the principles and concepts of an embodiment of the disclosure and generally designated by the reference numeral 10 will be described.

As best illustrated in FIGS. 1 through 5, the automated carting assembly 10 generally comprises a cart 12 that has a plurality of garbage containers 14 each being positioned thereon. The cart 12 has a slidably adjustable length for accommodating a varying number of the garbage containers 14. The garbage containers 14 may be those that are typically leased from a commercial garbage collection company or the like.

The cart 12 comprises a rear section 16 that has a top surface 18, a bottom surface 20, a rearward edge 22 and a forward edge 24. The rear section 16 has a stop 26 that is coupled to the rearward edge 22 and extends above the top surface 18. A pair of tracks 28 is each coupled to the bottom surface 20 of the rear section 16 and each of the tracks 28 is oriented perpendicular to the forward edge 24. Each of the tracks 28 includes a plurality of engagement points 30 being distributed along the tracks 28.

The cart 12 includes a middle section 32 that has an upper surface 34, a lower surface 36, a front edge 38 and a back edge 40. A pair of rails 42 is each coupled to the lower surface 36 of the middle section 32 and each of the rails 42 extends between the front 38 and back 40 edges. Each of the tracks 28 slidably receives a respective one of the rails 42 such that the middle section 32 is slidably coupled to the rear section 16. Thus, the front edge 38 is spaceable a selected distance from the forward edge 24 of the rear section 16. Moreover, each of the rails 42 releasably engaging a selected one of the engagement points 30 in the tracks 28 for retaining the cart 12 at the selected length.

The cart 12 includes a front section 44 that has a top surface 46, a bottom surface 48, a frontmost edge 50 and a rearmost edge 52. The rearmost edge 52 is coupled to the front edge 38 of the middle section 32 such that the front section 44 is spaceable a selected distance from the rear section 16. The frontmost edge 50 has a stop 54 coupled thereto and extends above the top surface 18. The stop 54 has a forward facing edge 56 and the forward facing edge 56 may be concavely arcuate. The garbage containers 14 are positioned upon each of the front 44, middle 32 and rear 16 sections having the garbage containers 14 being distributed between the stop 26, 54 on each of the front 44 and rear 16 sections.

A pair of rear straps 58 is provided and each of the rear straps 58 is coupled to and extends upwardly from the cart 12. Each of the rear straps 58 is positionable to extend over the garbage containers 14 and each of the rear straps 58 is positioned on the rear section 16. A pair of front straps 60 is each coupled to and extends upwardly from the cart 12. Each of the front straps 60 is positionable to extend over the garbage containers 14. Moreover, each of the front straps 60 is matable to a respective one of the rear straps 58 for retaining the garbage containers 14 on the cart 12. Each of the front straps 60 may have a buckle thereon for adjusting a length of each of the front straps 60.

A pair of rear wheels 62 is each rotatably coupled to the cart 12 for rolling on a support surface 64. Each of the rear wheels 62 is positioned on opposite sides of the rear section 16 of the cart 12 and each of the rear wheels 62 is aligned with the rearward edge 22 of the rear section 16. A pair of front wheels 66 is each rotatably coupled to the cart 12 for rolling along the support surface 64. Each of the front wheels 66 is positioned on opposite sides of the front section 44. Moreover, each of the front wheels 66 is pivotable about an axis that is oriented parallel to the frontmost 50 and rearmost 52 edges of the front section 44 for steering the cart 12 along the support surface 64. A control circuit 68 is coupled to the cart 12 and the control circuit 68 includes an electronic memory 70. A transceiver 72 is coupled to the cart 12 and the transceiver 72 is electrically coupled to the control circuit 68. Moreover, the transceiver 72 is in wireless electrical communication with a global positioning system (gps) 74 for establishing a physical location of the cart 12. The transceiver 72 may be a radio frequency transceiver 72 or the like and the transceiver 72 may employ Bluetooth communication protocols.

An electronic device 76, such as a smart phone or other consumer electronic device 76, is provided that has a display 78 and a transceiver 80. The transceiver 80 in the electronic device 76 is in wireless communication with the transceiver 72 on the cart 12. Additionally, the transceiver 80 in the electronic device 76 is in wireless communication with the gps 74. The electronic device 76 is manipulated, via a mapping program or other similar software stored in the electronic device 76, to program a predetermined route between a storage point 82 and a pickup point 84 into the electronic memory 70. Moreover, the electronic device 76 is manipulated to program selected times during the day to travel between the storage point 82 and the pickup point 84 into the electronic memory 70. The storage point 82 may be a location adjacent to a residence or the like and the pickup point 84 may be at a curbside for being emptied by the commercial garbage collection company.

A pair of steering actuators 86 is each coupled to the bottom surface 20 of the front section 44 and each of the steering actuators 86 is coupled to a respective one of the front wheels 66. Each of the steering actuators 86 pivots the respective front wheel 66 about the axis for steering and each of the steering actuators 86 is electrically coupled to the control circuit 68. Moreover, each of the actuators steers the front wheels 66 in accordance with the predetermined route programed into the electronic memory 70. Each of the steering actuators 86 may be electro-mechanical linear actuators or the like.

A pair of drive motors 88 is each coupled to the bottom surface 20 of the front section 44 and each of the drive motors 88 is rotatably coupled to a respective one of the front wheels 66. Each of the drive motors 88 is turned on to rotate in a forward direction or a rearward direction and each of the drive motors 88 is electrically coupled to the control circuit 68. Each of the drive motors 88 is turned on to rotate in the forward direction to transport the garbage containers 14 from the storage point 82 to the pickup point 84 at the selected time of day programmed into the electronic memory 70. Additionally, the drive motors 88 are turned on to rotate in the rearward direction to transport the garbage containers 14 from the pickup point 84 to the storage point 82 at the selected time of day programmed into the electronic memory 70. In this way the drive motors 88 transport the garbage can between the storage point 82 and the pickup point 84 autonomously. Each of the drive motors 88 may be electric motors or the like.

A power supply 90 is coupled to the cart 12 and the power supply 90 is electrically coupled to the control circuit 68. The power supply 90 comprises at least one battery 92 that is coupled to the cart 12. The at least one battery 92 is electrically coupled to the control circuit 68 and the at least one battery 92 may be a rechargeable battery. A pair of charge ports 94 is coupled to the frontmost edge 50 of the front section 44 and each of the charge ports 94 is electrically coupled to the at least one battery 92.

A charger 96 is provided and the charger 96 is positioned at the storage point 82 and the charger 96 is electrically coupled to a power source 98 comprising a female electrical outlet. The charger 96 has a plurality of terminals 100 thereon and each of the charge ports 94 receives a respective one of the terminals 100 when cart 12 drives to the storage point 82. Each of the terminals 100 is in electrical communication with the respective charge port 94 for charging the at least one battery 92. The charger 96 may have a well 102 therein and the well 102 may have a bounding surface 104 that is concavely arcuate. Thus, the well 102 may receive and conform to the forward facing edge 56 of the stop 54 on the front section 44 of the cart 12.

In use, the selected route between the storage point 82 and the pickup point 84 is selected on the electronic device 76 and the selected route is subsequently downloaded into the electronic memory 70 on the cart 12. Additionally, the travel schedule is selected on the electronic device 76 and is subsequently downloaded into the electronic memory 70. In this way the cart 12 can autonomously transport the garbage containers 14 to the pickup point 84 in accordance with the predetermined travel schedule to be emptied by the garbage company. Moreover, the cart 12 autonomously returns to the storage point 82 in accordance to the travel schedule thereby facilitating the garbage containers 14 to receive garbage. Additionally, the cart 12 docks with the charger 96 when the cart 12 travels to the storage point 82 for charging the at least one battery.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automated carting assembly being configured to autonomously transport garbage containers between a pickup point and a storage point, said assembly comprising:
   a cart having a plurality of garbage containers each being positioned thereon, said cart having a slidably adjustable length for accommodation a varying number of the garbage containers;
   a pair of rear straps, each of said rear straps being coupled to and extending upwardly from said cart, each of said rear straps being positionable to extend over the garbage containers,
   a pair of front straps, each of said front straps being coupled to and extending upwardly from said cart, each of said front straps being positionable to extend over the garbage containers, each of said front straps being matable to a respective one of said rear straps for retaining the garbage containers on said cart;
   a pair of rear wheels, each of said rear wheels being rotatably coupled to said cart for rolling on a support surface;
   a pair of front wheels, each of said front wheels being rotatably coupled to said cart for rolling along the support surface, each of said front wheels being steerable on said cart,
   a pair of steering actuators, each of said steering actuators being coupled to a respective one of said front wheels for steering said cart;
   a pair of drive motors, each of said drive motors being rotatably coupled to a respective one of said front wheels for driving said cart between a storage point and a pickup point; and
   wherein said cart comprises:
      a rear section having a top surface, a bottom surface, a rearward edge and a forward edge said rear section having a stop being coupled to said rearward edge and extending above said top surface; and
      a pair of tracks, each of said tracks being coupled to said bottom surface of said rear section, each of said tracks being oriented perpendicular to said forward edge.

2. The assembly according to claim 1, wherein said cart comprises:
   a middle section having an upper surface, a lower surface, a front edge and a back edge; and
   a pair of rails, each of said rails being coupled to said lower surface of said middle section, each of said rails extending between said front and back edges, said of said tracks slidably receiving a respective one of said rails such that said middle section is slidably coupled to said rear section, said front edge being spaceable a selected distance from said forward edge of said rear section.

3. The assembly according to claim 2, wherein said cart comprises a front section having a top surface, a bottom surface, a frontmost edge and a rearmost edge, said rearmost edge being coupled to said front edge of said middle section such that said front section is spaceable a selected distance from said rear section, said frontmost edge having a stop being coupled thereto and extending above said top surface, each of said rear, middle and front sections having the garbage containers being positioned thereupon for storage having the garbage containers being distributed between said stop on each of said front and rear section.

4. The assembly according to claim 3, wherein:
   each of said rear wheels is positioned on opposite sides of said rear section of said cart, each of said rear wheels being aligned with said rearward edge of said rear section; and
   each of said front wheels is positioned on opposite sides of said front section, each of said front wheels being pivotable about an axis being oriented parallel to said frontmost and rearmost edges of said front section for steering said cart along the support surface.

5. The assembly according to claim 3, further comprising:
   an electronic device being in electrical communication with said control circuit for programming a predetermined transport route and a predetermined transport schedule into said control circuit, said transceiver in said electronic device being in wireless communication with said transceiver on said cart;
   a control circuit being coupled to said cart, said control circuit including an electronic memory;
   a transceiver being coupled to said cart, said transceiver being electrically coupled to said control circuit, said transceiver being in wireless electrical communication with a global positioning system (gps) for establishing a physical location of said cart; and
   said electronic device having a display and a transceiver, said transceiver in said electronic device being in wireless communication with the gps, said electronic device being manipulated to program a predetermined route between said storage point and said pickup point into said electronic memory, said electronic device being manipulated to program selected times during the day to travel between said storage point and said pickup point into said electronic memory.

6. The assembly according to claim 5, wherein each of said steering actuators is coupled to said bottom surface of said front section, each of said steering actuators pivoting said respective front wheel about said axis for steering, each of said steering actuators being electrically coupled to said control circuit, each of said actuators steering said front wheels in accordance with the predetermined route programed into said electronic memory.

7. The assembly according to claim 5, wherein:
   each of said drive motors is coupled to said bottom surface of said front section;
   each of said drive motors being turned on to rotate in a forward direction or a rearward direction;
   each of said drive motors being electrically coupled to said control circuit;
   each of said drive motors being turned on to rotate in said forward direction to transport the garbage containers from the storage point to the pickup point at the selected time of day programmed into said electronic memory; and
   said drive motors being turned on to rotated in said rearward direction to transport the garbage containers from the pickup point to the storage point at the selected time of day programmed into said electronic memory, wherein said drive motors are configured to transport the garbage can between the storage point and the pickup point.

8. The assembly according to claim 3, further comprising a power supply, said power supply comprising:
- at least one battery being coupled to said cart, said at least one battery being electrically coupled to said control circuit;
- a pair of charge ports, each of said charge ports being coupled to said frontmost edge of said front section, each of said charge ports being electrically coupled to said at least one battery; and
- a charger being positioned at the storage point, said charger being electrically coupled to a power source comprising a female electrical outlet, said charger having a plurality of terminals thereon, each of said charge ports receiving a respective one of said terminals when cart drives to the storage point, each of said terminals being in electrical communication with said respective charge ports for charging said at least one battery.

9. An automated carting assembly being configured to autonomously transport garbage containers between a pickup point and a storage point, said assembly comprising:
- a cart having a plurality of garbage containers each being positioned thereon, said cart having a slidably adjustable length for accommodation a varying number of the garbage containers, said cart comprising:
    - a rear section having a top surface, a bottom surface, a rearward edge and a forward edge said rear section having a stop being coupled to said rearward edge and extending above said top surface;
    - a pair of tracks, each of said tracks being coupled to said bottom surface of said rear section, each of said tracks being oriented perpendicular to said forward edge;
    - a middle section having an upper surface, a lower surface, a front edge and a back edge;
    - a pair of rails, each of said rails being coupled to said lower surface of said middle section, each of said rails extending between said front and back edges, said of said tracks slidably receiving a respective one of said rails such that said middle section is slidably coupled to said rear section, said front edge being spaceable a selected distance from said forward edge of said rear section;
    - a front section having a top surface, a bottom surface, a frontmost edge and a rearmost edge, said rearmost edge being coupled to said front edge of said middle section such that said front section is spaceable a selected distance from said rear section, said frontmost edge having a stop being coupled thereto and extending above said top surface, each of said rear, middle and front sections having the garbage containers being positioned thereupon for storage having the garbage containers being distributed between said stop on each of said front and rear sections;
- a pair of rear straps, each of said rear straps being coupled to and extending upwardly from said cart, each of said rear straps being positionable to extend over the garbage containers, each of said rear straps being positioned on said rear section;
- a pair of front straps, each of said front straps being coupled to and extending upwardly from said cart, each of said front straps being positionable to extend over the garbage containers, each of said front straps being matable to a respective one of said rear straps for retaining the garbage containers on said cart;
- a pair of rear wheels, each of said rear wheels being rotatably coupled to said cart for rolling on a support surface, each of said rear wheels being positioned on opposite sides of said rear section of said cart, each of said rear wheels being aligned with said rearward edge of said rear section;
- a pair of front wheels, each of said front wheels being rotatably coupled to said cart for rolling along the support surface, each of said front wheels being positioned on opposite sides of said front section, each of said front wheels being pivotable about an axis being oriented parallel to said frontmost and rearmost edges of said front section for steering said cart along the support surface;
- a control circuit being coupled to said cart, said control circuit including an electronic memory;
- a transceiver being coupled to said cart, said transceiver being electrically coupled to said control circuit, said transceiver being in wireless electrical communication with a global positioning system (gps) for establishing a physical location of said cart;
- an electronic device having a display and a transceiver, said transceiver in said electronic device being in wireless communication with said transceiver on said cart, said transceiver in said electronic device being in wireless communication with the gps, said electronic device being manipulated to program a predetermined route between said storage point and said pickup point into said electronic memory, said electronic device being manipulated to program selected times during the day to travel between said storage point and said pickup point into said electronic memory;
- a pair of steering actuators, each of said steering actuators being coupled to said bottom surface of said front section, each of said steering actuators being coupled to a respective one of said front wheels, each of said steering actuators pivoting said respective front wheel about said axis for steering, each of said steering actuators being electrically coupled to said control circuit, each of said actuators steering said front wheels in accordance with the predetermined route programed into said electronic memory;
- a pair of drive motors, each of said drive motors being coupled to said bottom surface of said front section, each of said drive motors being rotatably coupled to a respective one of said front wheels, each of said drive motors being turned on to rotate in a forward direction or a rearward direction, each of said drive motors being electrically coupled to said control circuit, each of said drive motors being turned on to rotate in said forward direction to transport the garbage containers from the storage point to the pickup point at the selected time of day programmed into said electronic memory, said drive motors being turned on to rotated in said rearward direction to transport the garbage containers from the pickup point to the storage point at the selected time of day programmed into said electronic memory, wherein said drive motors are configured to transport the garbage can between the storage point and the pickup point;
- a power supply being coupled to said cart, said power supply being electrically coupled to said control circuit, said power supply comprising:
    - at least one battery being coupled to said cart, said at least one battery being electrically coupled to said control circuit;
    - a pair of charge ports, each of said charge ports being coupled to said frontmost edge of said front section, each of said charge ports being electrically coupled to said at least one battery; and a charger being positioned at the storage point, said charger being electrically coupled to a power source comprising a female electrical outlet, said charger having a plurality of terminals thereon, each of said charge ports receiving a respective one of said terminals when cart drives to the storage point, each of said terminals being in electrical communication with said respective charge ports for charging said at least one battery.

\* \* \* \* \*